April 28, 1936.   G. E. WENDT   2,038,815
LAMP BOWL RETAINER AND THE LIKE
Original Filed July 26, 1934

Inventor:
George E. Wendt.
by Thos. A. Banning Jr
Atty.

Patented Apr. 28, 1936

2,038,815

UNITED STATES PATENT OFFICE 2,038,815

LAMP BOWL RETAINER AND THE LIKE

George E. Wendt, Chicago, Ill.

Application July 26, 1934, Serial No. 737,094
Renewed March 5, 1936

4 Claims. (Cl. 240—128)

This invention relates to improvements in lamp bowl retainers and the like, that is, the means whereby lamp bowls for incandescent lamps and the like are retained within the sockets or holders provided for holding them. Usually the lamp bowl is provided with an annular edge flange which is curved or turned outwardly, to thereby provide a groove or annular recess around the edge of the bowl. The holder is then provided with several screws or the like, which are screwed inwardly to bring their inner ends into engagement with the bowl in the annular groove above referred to, so that the bowl cannot be withdrawn from the holder without first loosening the screws.

The above general type of construction is more or less generally used, and is practically standard for many forms and sizes of holders. It is open to the objection, however, that in case the screws are tightened so that they firmly engage the groove of the bowl when the bowl is cold, the expansion of the bowl incident to heating when in use will create a pressure between the screws and the bowl which is liable to crack or break the bowl, and at any rate places the bowl under such strain that shocks or unusual strains thrown on the bowl will result in cracking or breaking the same. Furthermore, due to the direct engagement of the unyielding screws with the groove of the bowl, there is always danger of straining or cracking or breaking the bowl when the screws are inserted.

The main object of the present invention is to provide a yielding support for the groove of the bowl, which support is pressed against the groove of the bowl in convenient manner as by means of the customary screws, and which yielding support is capable of transmitting the necessary force for giving the bowl proper support, but at the same time will yield under excess force or strain, to thereby prevent the imposition of such excess force or strain on the bowl proper. More specifically it is an object to provide a spring clip which is so formed that when the screws are tightened up or drawn home, they will cause such spring clip to engage the groove of the bowl, and thereby hold the bowl in place. These spring clips are also so formed that they are capable of natural adjustment into exact position with respect to the bowl and the holder so that each clip will naturally assume the proper and exact position to place the bowl under desired support and without the necessity of careful or exact adjustments of the clips themselves.

In connection with the foregoing, it is an object to provide an arrangement such that one end of each clip is given firm support with respect to the holder, and serves as a pivot or hinge on which the clip proper will rock, so as to cause the bowl groove retaining end of the clip to engage the groove of the bowl in a natural manner, and under a natural adjustment so that each clip will naturally come to a correct holding position with respect to the bowl.

A further object is to provide an arrangement such that the clips may be used in connection with many forms of bowls and holders now in use, and without the need of changing said bowls or holders, or using special tools therewith.

In connection with the foregoing, it is an object to provide an improved form of clip which connects the bowl to the holder, and which clip is itself so formed that it can be used with the standard forms of bowl and holder now in use, and thus make it possible to gain the benefits and advantages of the present invention in the case of large numbers of bowls and holders now in use.

Other objects and uses of the invention will appear from a detailed description of the same, which consists in the features of construction and combinations of parts hereinafter described and claimed;

Figure 1:
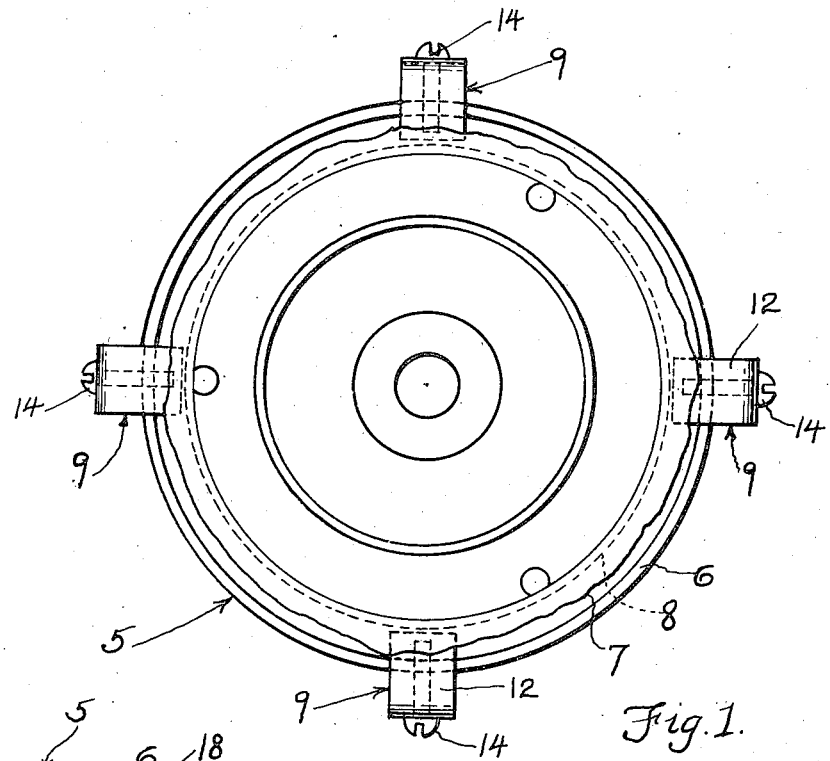
Figure 1 shows a bottom face view of a typical holder of well known form, together with a bowl set thereinto, and broken away, and with a series of clips embodying the present invention securing the bowl to the holder.

The holder illustrated in the drawing, is designated in its entirety by the numeral 5. It includes the downwardly extending flange 6 which receives the peripheral portion of the bowl 7, said peripheral portion being provided with the annular groove 8 which is to be engaged by the supporting means provided for retaining the bowl in place. It has heretofore been customary to provide a series of screws which are threaded through the flange 6 of the holder and into engagement with the annular groove of the bowl. Such screws, when provided, directly engage the glass or other frangible material of the bowl and, as already explained, when the bowl expands under increase of temperature when in use, the screws, being of an unyielding nature, create dangerous or fatal pressures on the material of the bowl.

Figure 2:
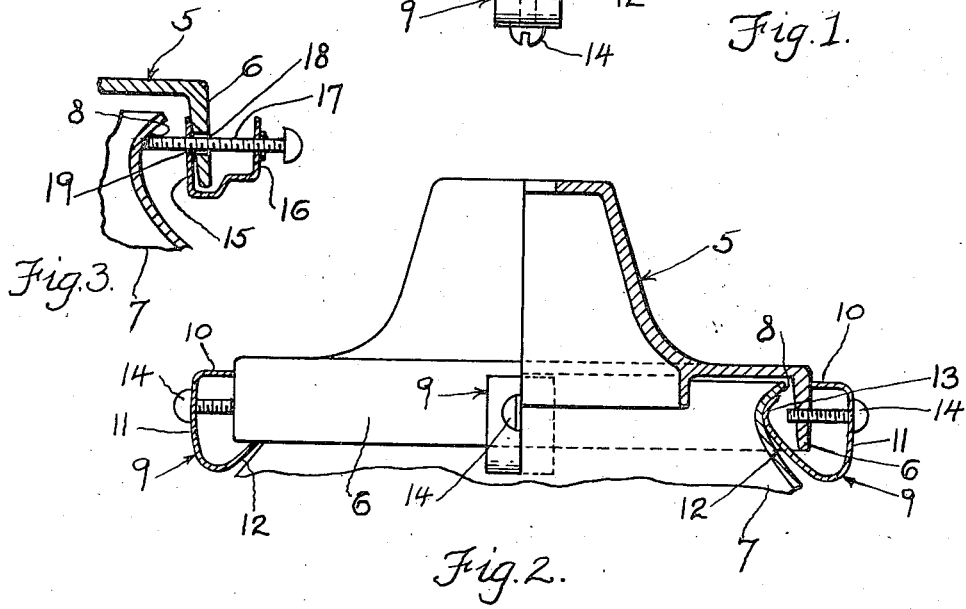
Figure 2 shows a side elevation, half in section, of the arrangement shown in Figure 1, and it shows particularly the form of the clip, and the manner in which the same cooperates with the groove of the bowl to hold the bowl in place under spring pressure.

According to the present invention, I provide a series of clips 9 around the bowl and the flange of the holder, each of which clips is made of relatively thin and springy material such as brass or steel, and is preferably made of a strip or strap thereof, bent into the desired form now to be explained. Each clip is so formed as to provide the lug 10, the body portion 11 substantially at right angles to the lug 10, and the inwardly and upwardly curved portion 12, which may be termed the bowl contacting portion. The bowl contacting portion reaches under the lower edge of the flange 6 of the holder as well shown in Figure 2, and the end portion of the bowl contacting portion 12 is inwardly curved on a sharper angle as shown at 13, to conform generally to the form of the annular groove of the bowl. Preferably the portion 13 is curved slightly sharper than the groove of the bowl so that said clip portion 13 engages the bowl at only one point as evident from Figure 2, being more or less at the bottom of the annular groove of the bowl.

The screw 14 is extended through a hole in the body portion 11 of the clip, and is threaded into the flange of the bowl holder, so that said screw, when drawn up, serves to pull the body of the clip over towards the flange of the holder, the clip pivoting on the lug 10, and the curved portion 12 of the clip is thus drawn and forced against the groove of the bowl; and the length of the screw is such that when it has been drawn home to draw the portion 13 of the clip firmly against the groove of the bowl, the screw does not come into engagement with the portions 12 or 13 of the clip, but said portions are left fully under spring action, and are free to exert their normal spring functions at all times. Furthermore, under the above conditions, in case of extreme expansion of the bowl edge the curved portions 12 and 13 of the clip will at all times be allowed to move to such extent as may be necessary to accommodate the expanded condition of the bowl, and without any jamming against the end of the screw 14.

It is to be noted that when the bowl is to be inserted into or removed from the holder, it is only necessary to loosen the screws, drawing them back so as to bring their inner ends substantially flush with the inner face of the flange 6, whereupon, the clips may be pulled back to allow the bowl to be readily set into place or removed from the holder.

It is also to be noted that the clips are set between the inner ends of the screws and the annular edge portion of the bowl, and that no changes of either bowl or holder are required from standard practice.

While I have herein shown and described only a single embodiment of the features of my present invention, still I do not intend to limit myself thereto, except as I may do so in the claims.

Figure 3:
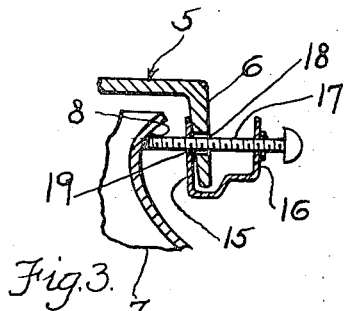
Figure 3 shows a fragmentary view of a modified form of clip in place on the flange and bowl.

In the form of clip shown in Figure 3 the same is provided with the arms 15 and 16 which embrace the holder flange 6 between them. The screw 17 is threaded through the arm 16 and passes freely through the hole 18 of the flange 6 and freely through the hole 19 of the clip arm 15, and into engagement with the annular groove 8 of the bowl 7. Due to the springy nature of the clip, the same can be spread or flexed as needed due to the engagement of the screw with the bowl and the expansion or contraction of the bowl with changes of temperature. I have therefore, in this form also, provided means for ensuring a spring pressure of the screw towards the bowl to therefore prevent the creation of undue or excess pressures between the parts.

It will be noted that I claim many advantages and benefits from the use of my invention. For example, and not by way of any limitation, the support of the bowls according to my invention will eliminate damage from many causes, such as excessive strains due to wind forces, shocks, and other causes. Furthermore, the presence of the spring clips practically eliminates all damage to the bowls from excessive tightening of the clips since such tightening merely serves to place the clips under extra spring force but by proper selection of the clip materials and sizes no such force will cause damage to the bowl.

I claim:

1. The combination with a lamp bowl having an annular retaining groove extending around its edge, and a holder therefor having a downwardly extending flange for surrounding said edge portion of the bowl, of means for retaining the bowl in place within the holder flange, comprising a series of clips of generally C-shaped form, and each having an inwardly extending lug adapted for engagement against the outside face of the holder flange to thereby provide a pivotal support for the clip against the flange, and each clip being adapted to reach in curving fashion around the lower edge portion of the flange, towards and into engagement with the annular groove of the bowl and being provided with a curved inner end portion adapted to enter into and engage the annular groove of the bowl, said clips being of springy material, and means for drawing the outer portion of each clip towards the outer face of the flange of the holder, comprising a screw extending through the outer portion of the clip and into threading engagement with the flange of the bowl, and serving to cause the clip to pivot on its lug aforesaid, to thereby force the inner end portion of the clip into spring engagement with the annular groove of the bowl, said screw retaining means being out of engagement with the inwardly curving portion of the clip which it engages, substantially as described.

2. The combination with a lamp bowl having an annular retaining groove extending around its edge, and a holder therefor having a downwardly extending flange for surrounding said edge portion of the bowl, of means for retaining the bowl in place within the holder flange, comprising a series of clips of generally C-shaped form embracing the flange of the holder, and reaching downwardly around the lower edge of the holder flange, each clip being provided with an inwardly extending lug portion adapted to engage the outer face of the flange and establish a pivotal support thereagainst, and the lower portion of each clip curving downwardly around and beneath the lower portion of the holder flange and terminating in a curved contacting end adapted to enter into and engage the annular groove of the bowl, each clip being formed of springy material, and being free of contact with the holder flange except at the pivotal point referred to, together with means for securing each clip to the flange and for drawing its inner end portion into engagement with the groove of the bowl, said means comprising a screw extended through the outer portion of the clip and into the flange of the holder, and serving to draw the clip towards the flange, said screw terminating short of the inner portion of the clip, to thereby leave said portion of the clip free for movement and adjustment under spring tension, and independently of interference from the screw, substantially as described.

3. The combination with a lamp bowl having an annular retaining groove extending around its edge, and a holder therefore having a downwardly extending flange for surrounding said edge portion of the bowl, of means for retaining the bowl in place within the holder flange, comprising a series of clips of generally C-shaped form embracing the flange of the bowl holder, and reaching downwardly around the lower edge of said flange, each clip being provided with an inwardly extending lug in engagement with the outer face of the flange and establishing a pivotal support for the clip against the flange, each clip being formed and reaching downwardly around the lower portion of the flange, and having its inner end portion curved and engaging the annular groove of the bowl, together with means for drawing each clip towards the bowl comprising a tension member extending through the clip and into the flange and serving to cause the clip to pivot on the lug aforesaid, each clip being of springy material, substantially as described.

4. The combination with a lamp bowl having an annular retaining flange extending around its edge, and a holder therefor having a downwardly extending flange for surrounding the edge portion of the bowl, of means for retaining the bowl in place within the holder flange, comprising a series of spring clips embracing the flange, and having portions lying to the outside of the flange, and portions reaching into engagement with the bowl groove, and means for retaining the clips on the flange and for drawing said clips into firm engagement with the bowl, said means being out of engagement with the clips at all points within the bowl flange, to thereby permit free adjustment of the clips and bowl without interference from the clip retaining means, substantially as described.

GEORGE E. WENDT.